United States Patent [19]
Jablonski et al.

[11] Patent Number: 6,039,220
[45] Date of Patent: *Mar. 21, 2000

[54] LOW PROFILE ICE DISPENSER

[75] Inventors: Ted M. Jablonski, Palatine, Ill.; Michael S. Meyer, Clear Lake; David A. Miller, Mason City, both of Iowa; Herman H. Martin, Hilliard, Ohio; Kenneth J. Emody, Carol Stream, Ill.; Gary S. Levine, Ramsey, Minn.; Peter Tinucci, Glendale Heights, Ill.

[73] Assignee: IMI Cornelius Inc., Anoka, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/111,088

[22] Filed: Jul. 6, 1998

Related U.S. Application Data

[60] Provisional application No. 60/052,113, Jul. 10, 1997.

[51] Int. Cl.[7] .................................................. G01F 11/20
[52] U.S. Cl. ........................ 222/236; 222/413; 222/412; 222/146.6
[58] Field of Search ................... 222/146.6, 236, 222/252, 412, 413

[56] References Cited

U.S. PATENT DOCUMENTS

| | | |
|---|---|---|
| 1,290,090 | 1/1919 | Cole . |
| 3,211,338 | 10/1965 | Weil et al. . |
| 3,341,065 | 9/1967 | D. A. Schuldt et al. ................ 222/413 |
| 3,387,750 | 6/1968 | Stencil . |
| 3,417,903 | 12/1968 | Callen ..................................... 222/413 |
| 3,463,362 | 8/1969 | Garber . |
| 3,570,720 | 3/1971 | Curry, III . |
| 3,580,428 | 5/1971 | Garber . |
| 3,608,786 | 9/1971 | Shelly et al. ............................ 222/413 |
| 3,610,482 | 10/1971 | Van Steenburgh, Jr. ................ 222/413 |
| 3,715,119 | 2/1973 | Shelley et al. ........................... 222/413 |
| 3,719,307 | 3/1973 | Larson ..................................... 222/236 |
| 3,798,923 | 3/1974 | Pink et al. . |
| 3,858,765 | 1/1975 | Landers . |
| 3,874,559 | 4/1975 | Pink . |
| 3,881,642 | 5/1975 | Hoenisch . |
| 3,913,343 | 10/1975 | Rowland et al. . |
| 4,049,161 | 9/1977 | Kohl . |
| 4,123,918 | 11/1978 | Kohl et al. . |
| 4,228,934 | 10/1980 | Carr ........................................ 222/412 |
| 4,248,276 | 2/1981 | Gosnell . |
| 4,423,830 | 1/1984 | Lents et al. . |
| 4,694,661 | 9/1987 | Landers . |
| 4,942,983 | 7/1990 | Bradbury . |
| 4,981,237 | 1/1991 | Landers . |
| 5,104,007 | 4/1992 | Utter . |
| 5,165,255 | 11/1992 | Alvarez et al. . |
| 5,230,448 | 7/1993 | Strohmeyer et al. . |
| 5,267,672 | 12/1993 | Jacobsen et al. . |
| 5,279,445 | 1/1994 | Fisher et al. . |
| 5,299,716 | 4/1994 | Hawkins et al. . |
| 5,542,573 | 8/1996 | Frantz . |

*Primary Examiner*—Andres Kashnikow
*Assistant Examiner*—Dinh Q. Nguyen
*Attorney, Agent, or Firm*—Sten Erik Hakanson

[57] ABSTRACT

The present invention comprises a below countertop dispenser that provides for reliable less destructive dispensing of ice, and that can fully remove the ice from the storage bin thereof. The invention herein utilizes a two part mechanism for lifting ice from the storage bin to a dispense chute positioned above the countertop. A disk type agitator/lift mechanism is first used to lift the ice to an ice channel communicating with the bottom of an auger housing. The bottom of the auger housing is positioned above the bottom most point of the ice storage bin. An auger is positioned vertically in the auger housing and provides for lifting ice from the bottom of the auger housing to the dispense chute.

8 Claims, 5 Drawing Sheets

LOW PROFILE ICE DISPENSER

This application claims benefit of Provisional Application 60/052,113 filed Jul. 10, 1997.

BACKGROUND OF THE INVENTION

1. Field of the Invention

The present application relates to ice dispensing machines and specifically to ice dispensing machines that can be located below a counter top.

2. Background

Ice dispensing machines are well known in the art and typically include an insulated bin for retaining a volume of ice cubes produced by an independent or attached ice maker. Such machines also include a mechanism for moving the cubes to a dispense chute from which they are dispensed into, for example, a beverage glass or an ice bucket. Ice dispensers are known that are designed for placement on a countertop wherein ice is lifted to a dispense chute and then falls by gravity into the waiting receptacle. Ice dispensers positioned below the level of a countertop are also known, and include a mechanism to lift ice from a bin to a suitable height above the level of the countertop so that it can be dispensed in a similar manner and from a similar vertical height as with the countertop dispenser. The below countertop approach to ice dispense has the advantages of not taking up valuable countertop space and blocking vision of a particular area, and allowing for easier loading thereof with ice.

However, a below countertop machine must lift the ice a greater vertical distance than is required in a countertop machine. Heretofore, the mechanisms employed in below countertop machines have had difficulty with lifting ice reliably and in a manner that does not unduly damage the ice with respect to the size of the particles thereof. Single vertical augers are known that rotate and move the ice from a position adjacent the bottom thereof to the ice dispense chute. However, it has been found that in such an arrangement the length of the auger places undesired torque demands on the drive motor thereof. Also, the length of the auger can make its removal for cleaning and sanitation purposes difficult. An auger can also have a tendency to cut or otherwise fragment the ice cubes, thus resulting in a less desirable mixture of whole cubes and small pieces thereof.

A further problem with under counter ice dispensers concerns the inability to fully empty the bin thereof of ice. Thus, a certain ice residue can remain in the bin that can not be effectively dispensed prior to the introduction of further ice into the bin. From a sanitation point of view it is better not to have much if any such residue carried over from filling to filling. In addition, prior art under counter ice dispensers have a problem with respect to easily facilitating periodic sanitation of the ice retaining bin thereof. In particular, and the ice bin can be difficult to obtain access to for permitting a thorough cleansing of the entire ice flow pathway.

Accordingly, it would be desirable to have an ice dispenser wherein the ice storage bin and a majority of the ice dispensing mechanism thereof can be located below the level of a standard countertop, and that provides for ease of cleaning, full utilization of each load of ice, ease of loading with ice, that minimizes any chipping or breaking of the individual ice particles or cubes, and that operates reliably.

SUMMARY OF THE INVENTION

The present invention comprises a below countertop dispenser that provides for reliable less destructive dispensing of ice, that can fully remove the ice from the storage bin thereof, and wherein the ice flow pathway and ice bin thereof are easily accessible and quickly sanitized. The invention herein includes an ice storage bin for retaining a volume of ice and an agitator disk type ice lifting mechanism angularly mounted therein. The agitator disk includes a plurality of arms symmetrically positioned around the circumference thereof for moving ice particles to an ice channel, and is driven by an agitator motor. The agitator disk also includes a pair of rigid ice agitating uprights extending transversely therefrom into the volume of the storage bin.

The ice channel is angled in a downward direction and connects with the bottom of a vertical auger housing. A vertical auger is positioned therein and driven by an auger motor. The auger extends to the top of the auger housing, which extends above the level of the countertop, and terminates with an ice dispensing chute. A switch mechanism is provided on the exterior of the auger chute and adjacent the dispense chute for actuating both the auger and agitator drive motors when ice is desired. The ice storage bin has a top opening that is covered by a pair of clamshell type doors hingedly secured to the top surface of the dispenser.

In operation, the switch mechanism is actuated causing the agitator disk to rotate whereby ice is lifted a first distance by the agitator arms to the ice channel. Movement of the agitator disk also causes movement of the ice by the uprights so that any large agglomerations of ice or ice damns caused by ice melting and re-freezing can be broken up. The ice then flows down the channel to the auger wherein simultaneous rotation thereof lifts the ice the remaining distance to the ice chute for dispensing therefrom into the desired receptacle. The vertical position of the bottom of the auger housing is above the lowest point of the ice storage bin wherein it can be appreciated that the agitator disk lifts the ice a portion of the vertical distance between the bottom of the bin and the ice dispense chute. The auger then provides for lifting the ice the remaining distance from the auger housing bottom to the ice dispense chute. This two part or two stage lifting approach of the present invention has the mechanical advantage of dividing the work and lifting between two separate mechanisms. Moreover, the agitator disk type mechanism will lift ice in a manner that is less destructive thereto than occurs with an auger. Thus, the present invention lifts ice in a manner that is less destructive thereto than if only an auger were employed. The ice storage bin is also designed in a manner to direct all the ice therein towards the arms of the agitator disk wherein all the ice can be removed from the storage bin.

The present invention is easily sanitized as the clamshell doors provide quick and complete access to the ice storage bin and agitator assembly. The shortened auger of the present invention also permits easy removal and cleaning thereof.

DESCRIPTION OF THE DRAWINGS

A better understanding of the structure, function, operation and advantages of the present invention can be had by referring to the following detailed description which refers to the following drawing figures, wherein.

DETAILED DESCRIPTION OF THE PREFERRED EMBODIMENT

Figure 1:
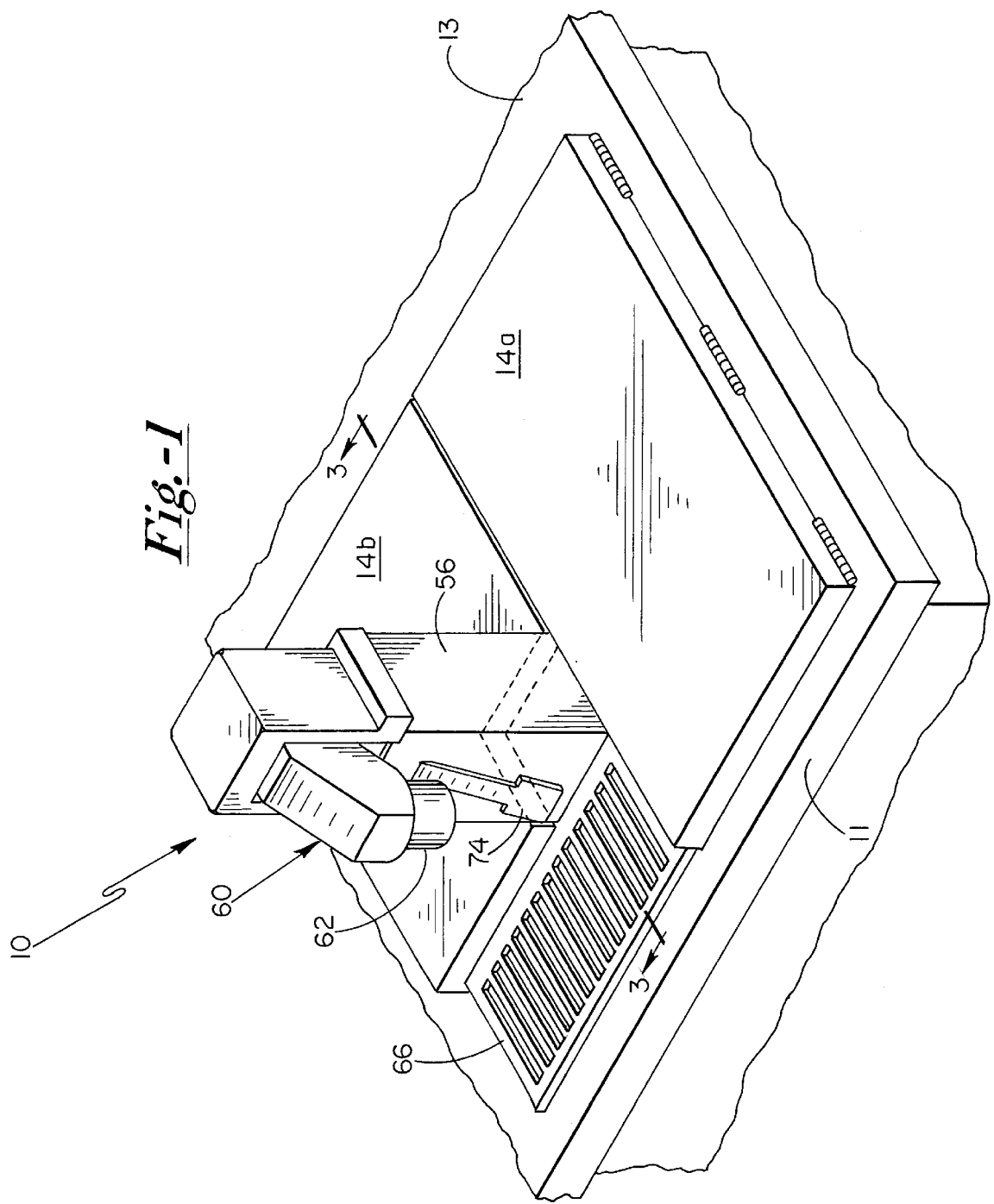
FIG. 1 shows a top perspective view of the present invention.
Figure 2:
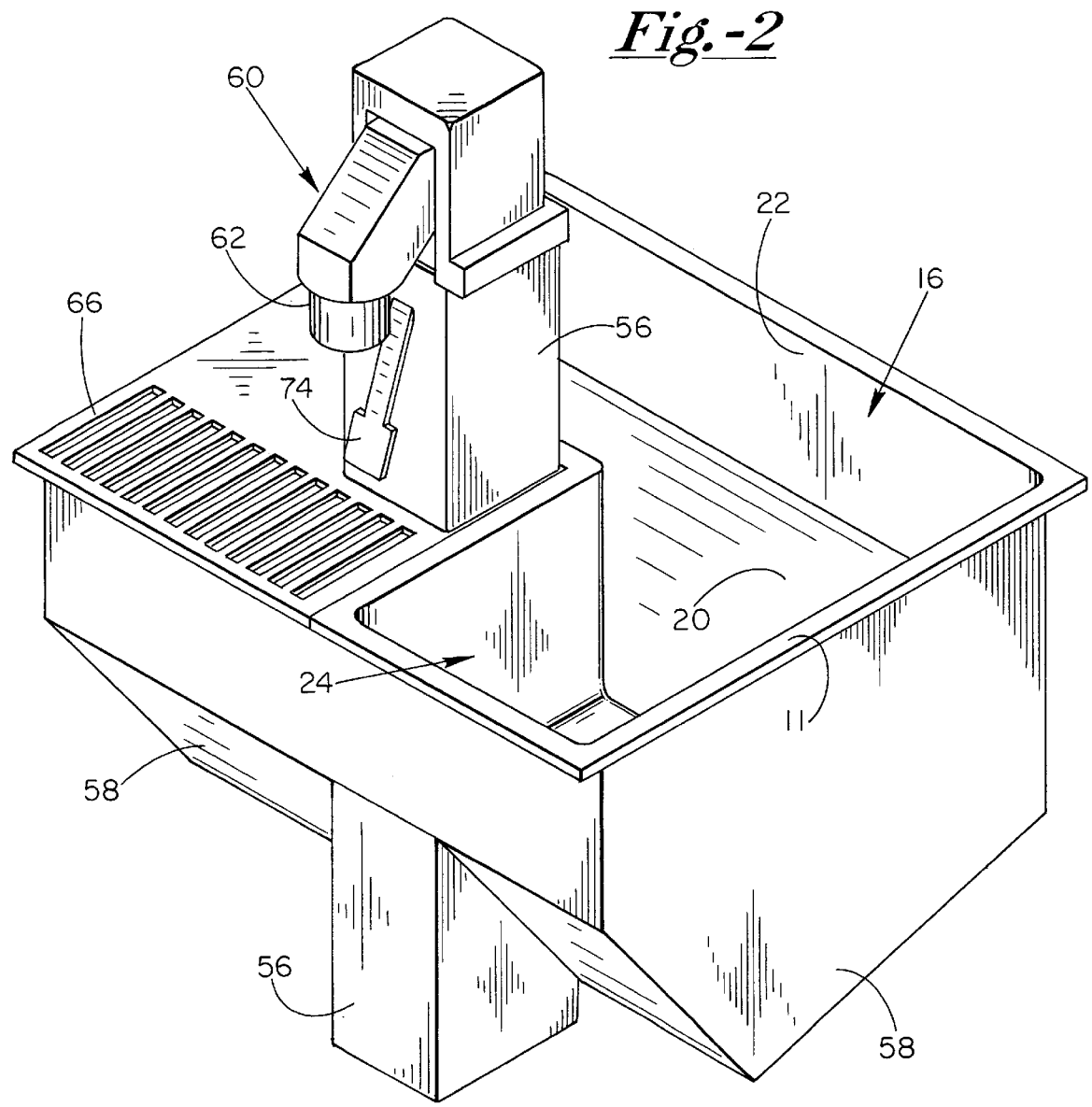
FIG. 2 shows a further perspective view of the present invention with the bin top cover removed and outside of a countertop support structure.
Figure 3:
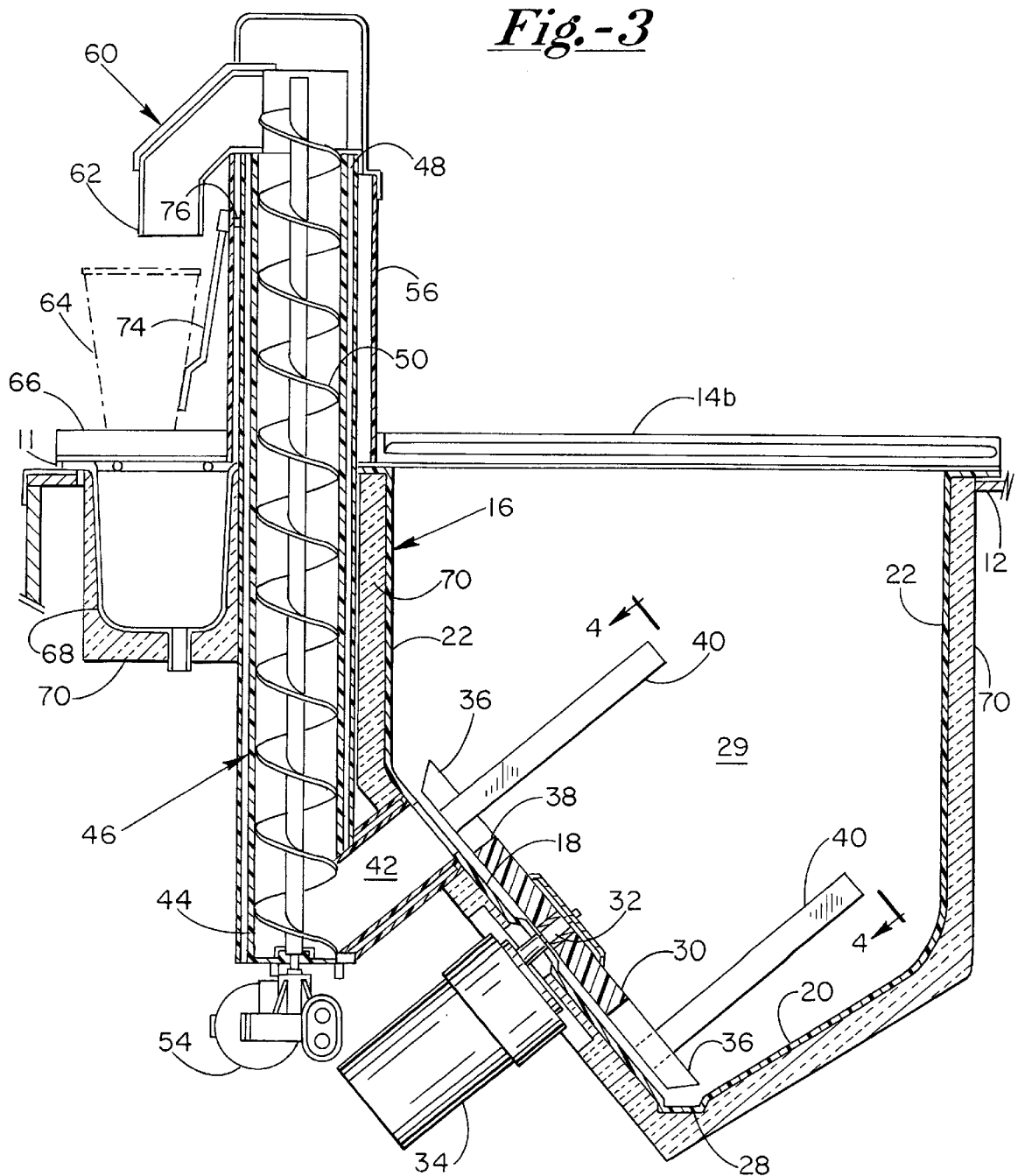
FIG. 3 shows a cross-sectional view along lines 3—3 of FIG. 1.
Figure 4:
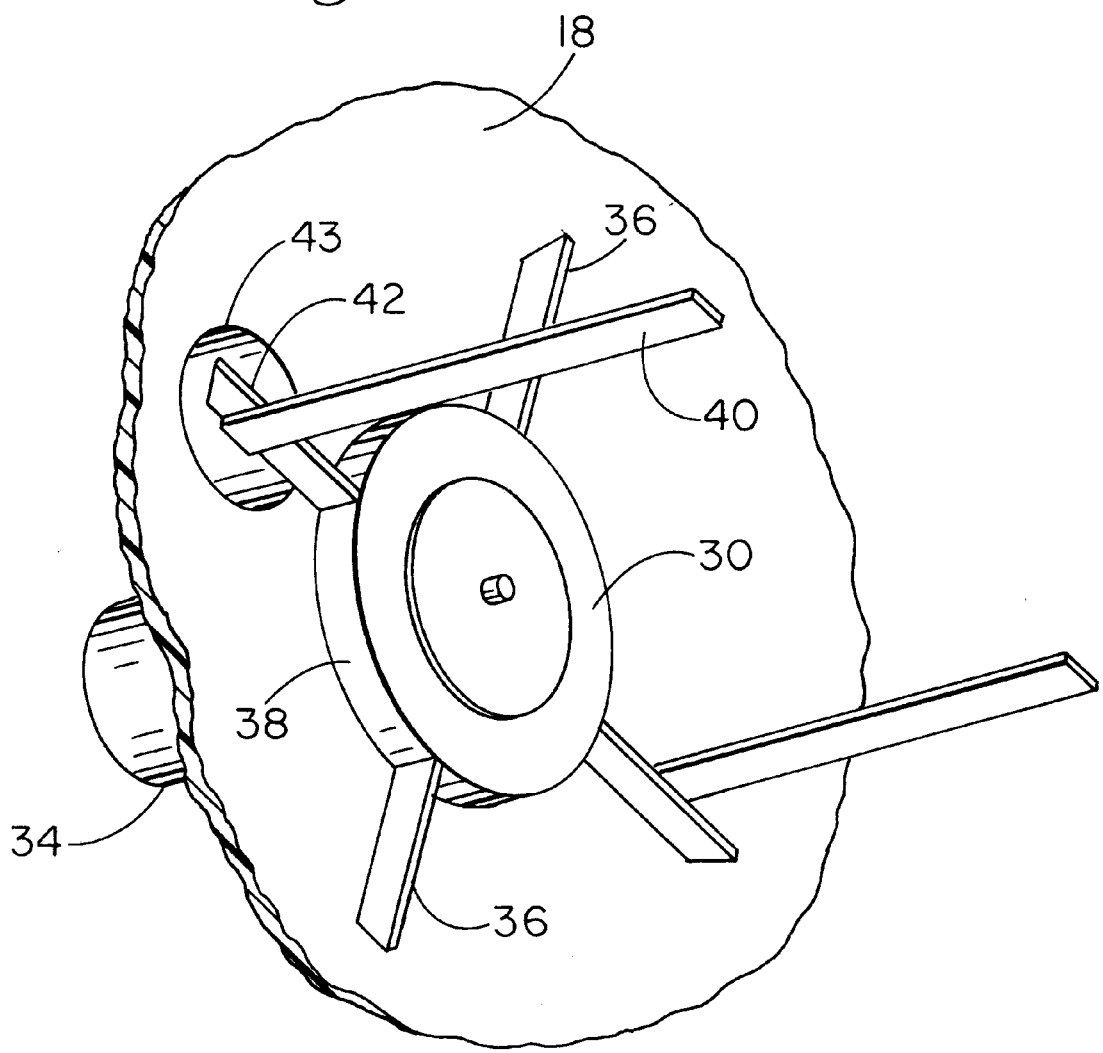
FIG. 4 shows a perspective view along lines 4—4 of FIG. 3.
Figure 5:
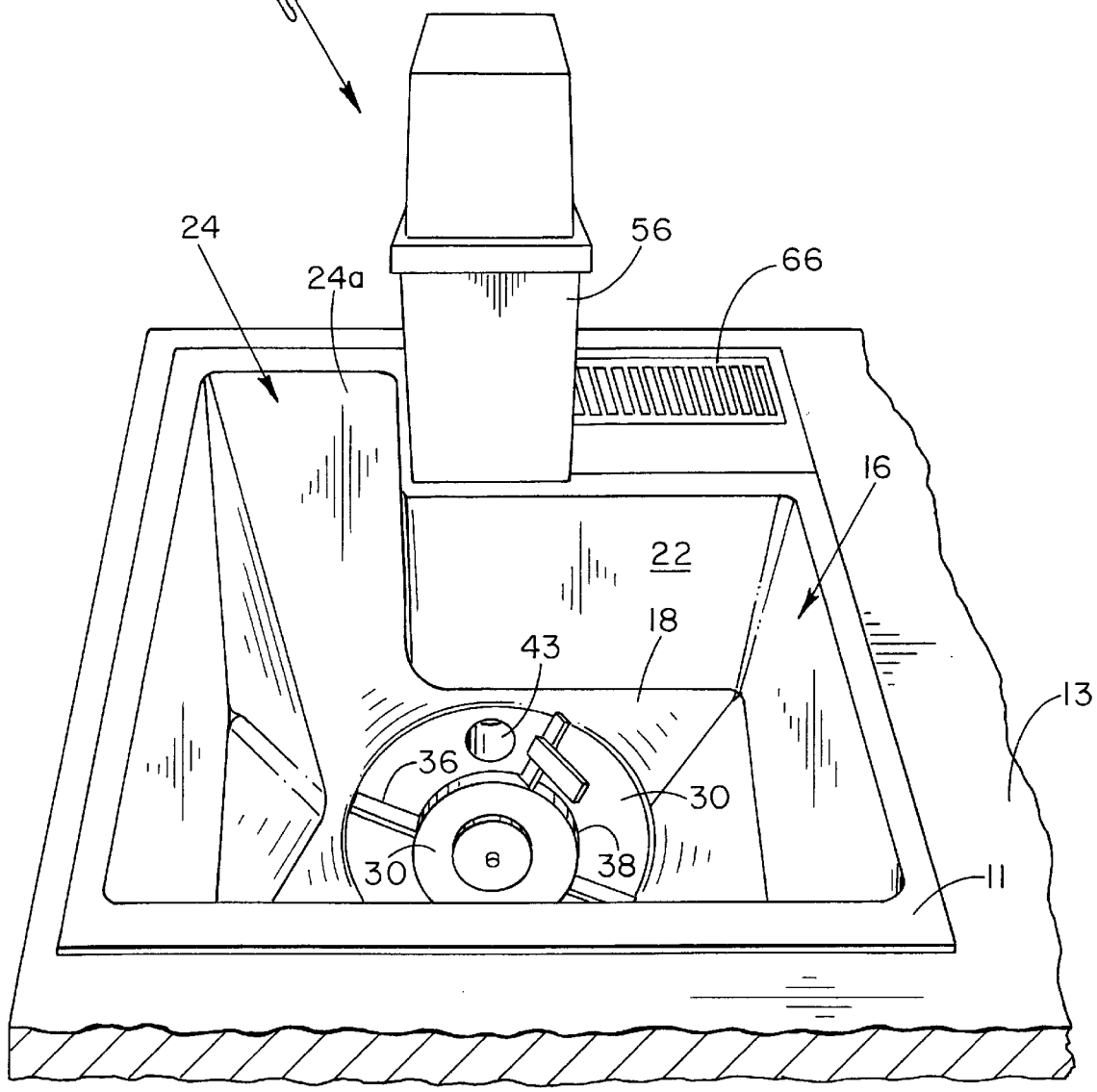
FIG. 5 shows a further top perspective vies of the interior volume area of the ice retaining bin.

The ice dispenser of the present invention is seen in the various figures and referred to generally by the numeral 10. Dispenser 10 includes a perimeter lip 11 that permits support thereof on a corresponding perimeter shoulder 12 of a opening cut into a countertop 13. A pair of doors 14a and 14b are hingedly secured to dispenser 10 along portions of the perimeter lip 11 thereof.

As seen by also referring to FIG.'S 2–5, dispenser 10 includes an ice storage bin 16 that is generally formed of a suitable plastic material and provides for retaining of a volume of ice particles or cubes therein. Bin 16 includes a major angled wall 18 and a minor angled wall 20 and vertically extending sidewalls 22. Bin 16 also includes an extended portion 24 including an angled surface 24a. All the bin angled and vertical surfaces terminate at a bin bottom end 28 and serve to define a bin interior volume 29.

A disk type agitator/lift mechanism includes an agitator disk 30 secured to a shaft 32 of an agitator drive motor 34, which shaft 32 sealably extends through bin major angular portion 18. Disk 30 includes a plurality of arms 36 secured symmetrically around the perimeter edge 38 thereof. A pair of rigid metal uprights 40 are secured to an opposite pair of the arms 36 and extend into the interior volume 29.

An angularly disposed ice channel 42 is secured to and provides fluid communication between an opening 43 into bin 16 and the lower end 44 of an auger housing 46. Auger housing 46 is tubular and extends upward through a top surface of dispenser 10 to a top end 48 thereof. An auger 50 extends within tube 46 and is rotatively secured therein. Auger 50 is rotated by an auger drive motor 54. A protective rectangular housing 56 extends around housing 46. Further sheet metal 58 extends around bin 16 for providing protection thereof and of the various components thereof, such as motors 34 and 52. An ice dispensing chute 60 is secured to the top of housing 56 and tube 46 and serves to direct ice downward therefrom through a nozzle end 62 thereof into a suitable receptacle such as a cup 64 shown in dashed line.

The cup 64 sits on a grate 66 that is secured above a drip or drain tray 68 into which ice particles and water can enter and be drained away. Insulation 70 can be placed around driptray 68 and bin 16 to prevent condensation thereon and in the case of bin 16 to resist melting of the ice therein. A lever arm 74 is pivotally secured to housing 56 and serves to operate a switch 76. Switch 76 is electrically connected to motors 34 and 52 and provides for operation thereof.

In operation, door 14a can be opened to permit the loading of ice into bin 16. It will be appreciated that area 24 of bin 16 permits added area through which the ice can pass thereby facilitating that process. Of course, both doors 14a and 14b could be opened for that loading, however, use of both doors generally is of more value when cleaning bin 16 as full direct and easy access thereto is then permitted. With ice in bin 16 switch 76 can be actuated by the pushing of cup 64 against arm 74. Both motors 34 and 52 are then operated simultaneously wherein disk 32 and auger 50 are rotated. As is known in the art, arms 36 thereof scoop up some of the ice and direct it to opening 43 wherein it will fall under gravity down channel 42 to the bottom 44 of auger housing 46. As is also understood in the art, auger 50 will then lift the ice up to chute 60 so that it can then fall there through, again under the influence of gravity, into cup 64. When a desired amount of ice has filled cup 64, the operator will move it away from lever 74 opening switch 76 and stopping the operation of motors 34 and 52.

It can be appreciated that dispenser 10 includes two lift systems for moving the ice from the bottom end 28, that is, the lowest horizontal level or point of bin 16 to the top end 48 of auger housing 46. Thus the disk type agitator/lift system provides for lifting the ice a first distance to a horizontal level of the lower or bottom end 44 of the tubular auger housing 46. The auger 50 is the second lift system that lifts the ice the remaining distance between the horizontal levels of the auger housing lower end 44 and top end 48. Thus, the present invention gains the advantage the effective clearing of all ice particles provided by the disk type agitator/lift system as well and the relatively gentle handling of the ice provided thereby. Specifically, it can be appreciated that the sloping configuration of the sidewalls of bin 16 toward bottom end 28 and the position of disk 32 and the arms 36 thereof in bottom end 28 serve to direct all ice particles to arms 36 so that all the ice therein is moved into opening 43 whereby no residual ice is left in bin 16. In addition the present invention has the advantage of a significantly shortened auger lift system that lifts the ice from a level above that of the lower most point of the bin 16, i.e. does not have to lift ice from that lowest point to the ice dispense chute 60. The shortened auger permits easier removal thereof for cleaning and requires less of a torque demand on motor 54, hence a smaller lower cost motor can be utilized and less wear thereon provides for greater life thereof. The separate agitator motor 34 rotates the disk 30 which serves to lift the ice to opening 43 and moves uprights 40 that serve to churn the ice in bin 16 to prevent any agglomeration or ice damn forming thereof due to melting and re-freezing.

We claim:

1. A below counter ice dispenser comprising:

an ice storage bin located below a level of the countertop for retaining a volume of ice therein, a first ice lifting mechanism within the ice storage bin and operable for lifting ice within the ice storage bin from a bottom point thereof to a first level below the level of the countertop, a second ice lifting mechanism for lifting ice from the first level to a second level above the level of the countertop, and the second level having an ice dispense point so that operation of the first and second ice lifting mechanisms provides for lifting ice from the ice storage bin to the dispense point for dispensing of the ice therefrom.

2. The dispense as defined in claim 1, and the first ice lifting mechanism comprising a rotatively operable disk within the ice storage bin and having ice lifting arms extending around an exterior perimeter thereof for lifting ice from a bottom point of the ice storage bin to the first level.

3. The dispense as defined in claim 2, and further including agitator arms on the disk for providing agitation of ice within the ice bin.

4. The dispense as defined in claim 1, and the second ice lifting mechanism comprising a rotatively operable auger disposed within an auger housing, the auger having a first end positioned at the first level and a second end at the second level.

5. A below counter ice dispenser, comprising:

an ice storage bin located below a level of a countertop for a retaining a volume of ice therein, a rotatively operable disk within the ice storage bin and having ice lifting arms extending around an exterior perimeter thereof for lifting ice from a bottom point of the ice storage bin to a first level below the level of the countertop, a rotatively operable auger disposed within an auger housing, the auger having a first end positioned at the first level and a second end at a second level above the level of the countertop for lifting ice from the first level to an ice dispense pooint at the second level so that operation of the disk and the auger provides for lifting ice from the ice storage bin to the dispense point for dispensing of the ice therefrom.

6. The dispenser as defined in claim 5, and further including agitator arms on the disk for providing agitation of ice within the ice bin.

7. A below counter ice dispenser, comprising:

an ice storage bin located below a level of a countertop for retaining a volume of ice therein, a rotatively operable disk within the ice storage bin and having ice lifting arms extending around an exterior perimeter thereof for lifting ice from a bottom point of the ice storage bin to a first level below the level of the countertop, an ice chute extending downward from the first level to a third level below the first level and above the ice bin bottom point, a rotatively operable auger disposed within an auger housing, the auger having a first end positioned at the third level and a second end at a second level above the level of the countertop for lifting ice from the third level to an ice dispense point at the second level so that operation of the disk lifts ice to the ice chute to flow there along to the auger first end so that rotation of the auger lifts ice to the dispense point for dispensing of the ice therefrom.

8. The dispenser as defined in claim 7, and further including agitator arms on the disk for providing agitation of ice within the ice bin.

* * * * *